June 8, 1943.  R. R. COOK  2,321,464
CULTIVATOR
Filed March 29, 1941  2 Sheets-Sheet 1
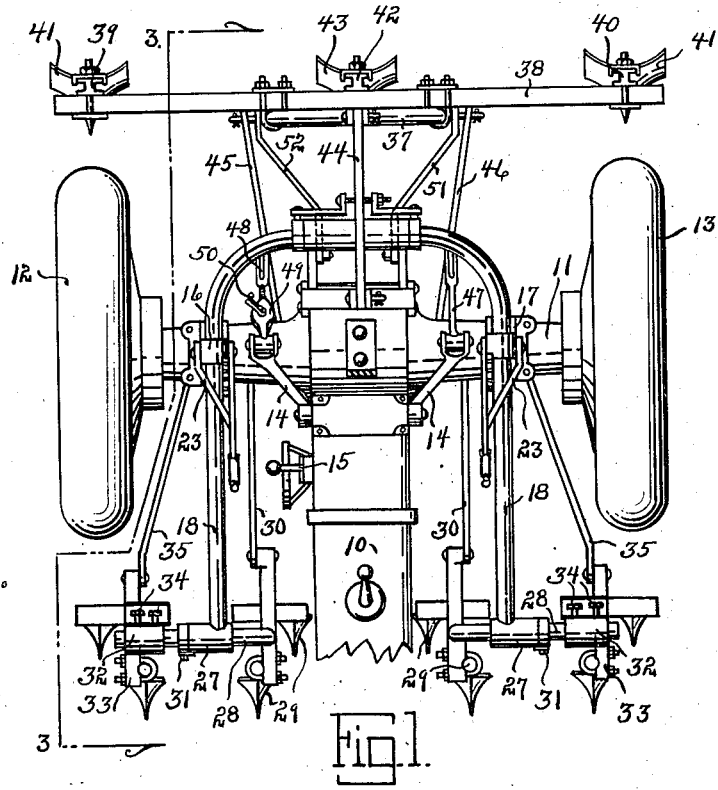
INVENTOR.
R. R. Cook
BY M. Talbert Dick
ATTORNEY

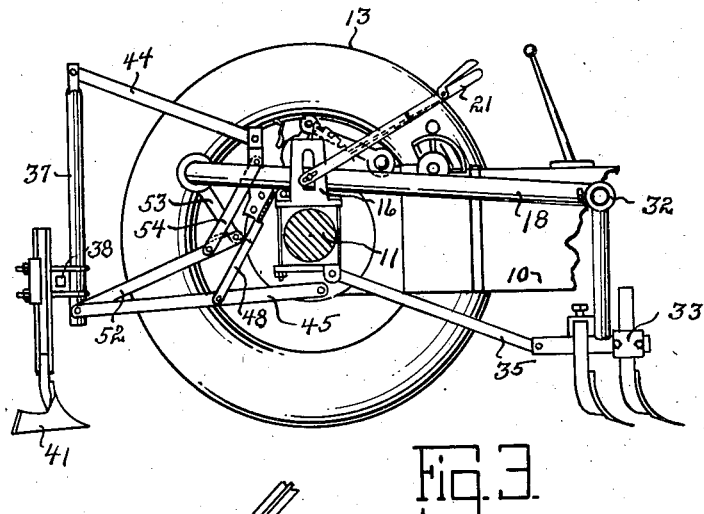
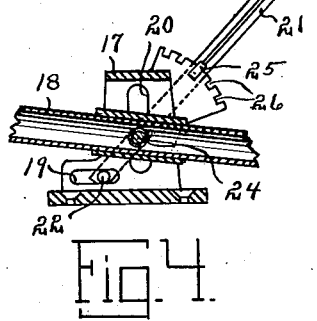
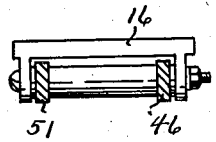
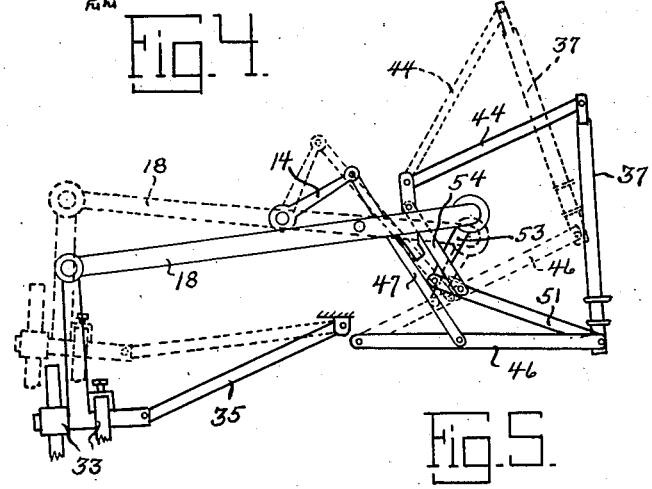
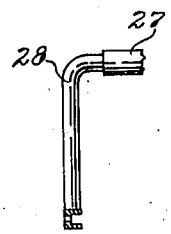

Patented June 8, 1943

2,321,464

UNITED STATES PATENT OFFICE 2,321,464

CULTIVATOR

Roger R. Cook, Des Moines, Iowa

Application March 29, 1941, Serial No. 385,784

4 Claims. (Cl. 97—47)

The principal object of my invention is to provide a highly desirable cultivator for tractors and especially for certain tractors made.

A further object of my invention is to provide a cultivator apparatus for tractors that not only efficiently reconditions the ground at each side of the rows of corn or like, but also reconditions the ground in the rear of the tractor wheels.

A still further object of this invention is to provide a cultivator for tractors wherein the main cultivator frame is movably supported by any suitable means to the rear portion of a tractor and with the earth engaging elements forward of the rear axle of the tractor.

A still further object of my invention is to provide a highly efficient cultivator device for tractors that may be easily and quickly raised or lowered by a hydraulic means.

A still further object of this invention is to provide a cultivator apparatus for tractors that permits the various adjustments and is under the complete control of the operator.

A still further object of this invention is to provide a cultivator for tractors that is simple in construction, economical in manufacture, and durable in use.

These and other objects will be apparent to those skilled in the art.

My invention consists in the construction, arrangement and combination of the various parts of the device, whereby the objects contemplated are attained and hereinafter more fully set forth, pointed out in my claims and illustrated in the accompany drawings, in which:

Fig. 1 is a top plan view of my cultivator attached to the rear end portion of a tractor.

Fig. 2 is a back end view of my device installed on a tractor.

Fig. 3 is a longitudinal cross sectional view of certain parts of the device taken on line 3—3 of Fig. 1.

Fig. 4 is an enlarged cross sectional view of one of the U-member supporting block assemblies.

Fig. 5 is a side view of certain parts of the cultivator frame showing their elevated positions in dotted lines.

Fig. 6 is an enlarged view illustrating the manner in connecting certain of the frame links to the tractor.

Figure 7 is a front view of a portion of the forward end of the frame.

The use of cultivators associated with tractors is very old. The chief objection, however, to most such tractor cultivators now on the market is that they are very complicated, are not easily attached or detached and are not easily operated and controlled. I have overcome such objections by providing a cultivator that may easily be attached to the rear end portion of a tractor with the main cultivator shafts forward of the rear axle of the tractor and one that is easily adjusted and manipulated.

Referring to the drawings, I have used the numeral 10 to designate an ordinary tractor having the rear axle 11, rear wheels 12 and 13, the hydraulic lift arms 14 and the hydraulic lever control 15, which is manually operated for causing the arms 14 to be hydraulically lowered or raised. It is to such a tractor that I secure my cultivator and which I will now describe in detail. The numeral 16 and the numeral 17 designate two base members secured by any suitable means such as clamps, bolts, revets, welding or like to the rear axle 11 of the tractor. These two members 16 and 17 are spaced apart and located adjacent the wheels 12 and 13 of the tractor respectively as shown in Fig. 2.

The numeral 18 designates a U-frame member of two pieces rotatably held together within a bearing portion at its center portion and having its arm portions extending forwardly and loosely through the members 16 and 17 respectively. The numeral 19 designates a substantially horizontal slot opening in each of the blocks 16 and 17. The numeral 20 designates a substantially vertical slot-way in each of the two sides of each of the block members 16 and 17. The numeral 21 designates a hand lever operating on each of the blocks 16 and 17 having a lug 22 slidably mounted and a horizontal slot opening 19 as shown in the drawings. The member 21 extends downwardly along the inner side of the block member to which it is attached and has a projection 23 that extends along the opposite side of the block member to which it is associated as shown in Fig. 2. The numeral 24 designates a horizontal pin extending through each of the members 21 and their member 23. Each of these pins extend through the two slot openings 20 of the block member to which the lever is associated and also through that portion of the U-member 18 that extends through the block members. By this arrangement, when one of the levers 21 is manually moved downwardly, that side of the U-member will drop downwardly, and if the same lever is moved upwardly, that side of the U-member will be raised in its bearing block. On the other hand, if the other lever 21 at the other side of the U-member is lowered or raised, it will effect that side of the U-member. This makes possible the manual adjustment and control of the movement of the U-member and compensates for different cultivating conditions such as when one wheel of the tractor is traveling in a rut. Each of the handle levers 21 has the usual catch release 25 capable of selectively engaging notches 26 on the block members for rigidly holding the two handle members in the positions desired. As the U-member is pivoted at its two side portions over the axle 11 of the tractor, its forward end may move downwardly, thereby bringing its rear end upwardly and its rear end may move downwardly, thereby bringing its forward end upwardly. The numeral 27 designates a sleeve on the forward end of each of the ends of the U-member 18 as shown in Fig. 1. The numeral 28 designates a shaft having its upper portion horizontally slidably mounted in each of the sleeves 27. Each of these shafts have their inner ends bent downwardly to support an earth engaging shovel assembly 29. The numeral 30 designates a link connected to each of these inner shovel assemblies and their other end loosely and pivotally connected to a point under the rear axle 11 of the tractor as shown in Fig. 1. These inner shovel assemblies may each have one or more shovels. The numeral 31 designates a set screw in each of the sleeves 27 for adjustably securing the sliding movement of the shafts in these sleeves. The numeral 32 designates a sleeve on the outer end portion of each of the shafts 28. The numeral 33 designates a downwardly extending earth engaging shovel assembly secured to each of the two sleeves 32. Each of these shovel assemblies or units may have one or more shovels. The numeral 34 designates set screws for adjustably securing the sleeves 32 on their shafts. The numeral 35 designates a link having one end secured to each of the outer shovel assemblies and its other end loosely secured to a point under the rear axle 11 of the tractor as shown in the drawings. By this arrangement, the set screws 31 and 34 may be loosened and the two pairs of inner and outer shovel assemblies moved independently to the left or to the right. After the desired adjustment is obtained the set screws will obviously be tightened. The links hold the shafts and prevent the assemblies from rotation while the set screws hold such assemblies laterally. It will be noted that the main shovel assemblies that are designed to cultivate the ground at each side of two rows of corn or like are all far forward of the rear axle 11 of the tractor.

I will now explain the auxiliary rear cultivator portion for re-loosening the dirt back of the tractor wheels. The numeral 37 designates a substantially vertical rear U-member positioned back of the rear axle of the tractor as shown in Fig. 1. The numeral 38 designates a substantially horizontal bar secured to the two lower portions of the U-member 37 by a suitable means. The numeral 39 and the numeral 40 designate two vertically adjustable posts on the two outer end portions of the bar 38. The numeral 41 designates a shovel unit on the lower end portion of each of the members 39 and 40 and located directly in the rear of the wheels 12 and 13 respectively of the tractor as shown in Fig. 2. The numeral 42 designates an adjustable post secured to the central portion of the bar 38 and carrying also a shovel unit 43 for engaging the ground directly in the rear of the front wheel of the tractor. The numeral 44 designates a link pivotally connected to the upper portion of the U-member 37 at one end and having its other end pivotally connected to the tractor housing above the rear axle. The numerals 45 and 46 designate two spaced apart links each having their rear ends hingedly secured to the two lower portions of the U-member 37 respectively, and their other ends hingedly secured to the tractor housing below the rear axle as shown in the drawings. By this construction the U-member 37 may swing upwardly or downwardly. The numerals 47 and 48 designate two link members having their upper ends hingedly secured to the two arms 14 respectively and their lower ends hingedly secured to the central portions of the two arms 45 and 46 respectively. The numerals 51 and 52 designate two arms pivotally secured to the lower portions of the U-member 38 and extending upwardly and forwardly. The numeral 53 designates a link operatively hingedly secured to the central portion of the U-member 18 and operatively hingedly connected to the forward ends of the arms 51 and 52. The numeral 54 designates two links having their upper ends hingedly secured to the tractor housing and extending downwardly and rearwardly where they are hingedly secured to the two arms 51 and 52 at locations back of the extreme pivot points of these two members as shown in the drawings. By this arrangement, when the hydraulic control lever 15 is manually moved in one direction, the arms 14 will slowly move downwardly, thereby lowering the U-frame assembly 38 and lowering the forward end assembly of the U-member 18, thereby bringing all of the shovel units into contact with the ground. When the hydraulic control lever is manually moved in the opposite direction, the arms 14 will move upwardly, thereby raising the substantially vertical U-frame assembly 38 and raising the forward ends of the substantially horizontal U-member 18. This action is shown in dotted lines in Fig. 5 and illustrates the simultaneous operation of the two frame portions for raising the forward shovel assemblies and the rear shovel assemblies. All of these shovel assemblies are simultaneously lowered in the reverse manner thereby making the entire cultivator under the complete control of the operator at all times with the mere movement of one single lever. As the power for lowering or raising the shovels is by hydraulic means, practically no effort is required on the part of the operator.

It will be noted that in my construction the entire cultivator is properly balanced on and supported by the rear axle portion of the tractor.

Some changes may be made in the construction and arrangement of my improved cultivator without departing from the real spirit and scope of my invention, and it is my intention to cover by my claims any modified forms of structure or use of mechanical equivalents which may be reasonably included within their scope.

I claim:

1. A cultivator for use on a tractor comprising a substantially U-shaped frame structure adapted to at least partially encircle the sides and rear of the central portion of the tractor, supports supported by the rear axle housing of the tractor for pivotally supporting said frame structure, attachments for cultivator shovels on the arm members of said U-shaped frame structure in front of the rear axle, frame structure pivotally mounted for attaching shovels behind the rear wheels of the tractor, and means for controlling the positions of both of said frame structures on their respective pivots.

2. A cultivator for use on a tractor comprising a substantial U-shaped structure adapted to at least partially encircle the sides and rear of the central portion of the tractor, supports on the rear axle housing of the tractor for pivotally supporting said frame structure, attachments for cultivator shovels on the arm members of said U-shaped frame structure in front of the rear axle, frame structure pivotally mounted for attaching shovels behind the rear wheels of the tractor, and a single means for controlling the positions of both of said frame structures on their pivots for causing engagement on the ground of the shovels carried thereby and for raising said shovels into supported elevated positions.

3. A cultivator for use on a tractor having a hydraulic power mechanism comprising a substantially U-shaped frame structure adapted to at least partially encircle the sides and rear of the central portion of the tractor, supports on the rear axle housing of the tractor for pivotally supporting said frame structure, attachments for cultivator shovels on the arm members of said U-shaped frame structure in front of the rear axle, frame structure pivotally mounted for attaching shovels behind the rear wheels of the tractor, and a single means, capable of being operated by said hydraulic power mechanism, for controlling the positions of both of said frame structures on their pivots for causing engagement with the ground of the shovels carried thereby and for raising said shovels into supported elevated positions.

4. A cultivator for use on a tractor having a hydraulic power mechanism comprising a substantially U-shaped frame structure adopted to at least partially encircle the sides and rear of the central portion of the tractor, a housing block secured to the housing of the rear axle of the tractor on each side of the center thereof, an opening through each of said housing blocks for receiving one of the arms of the said U-shaped frame structure, substantially vertical slots in the other two side walls of each said block, a pin extending through each said arm into the vertical slots of the respective housing blocks, lever structure at least indirectly engaging said arms for causing vertical displacement of said arms when said lever structure is operated to regulate the height of the U-shaped structure, attachments for cultivator shovels on the arm members of the said U-shaped frame structure in front of the rear axle, frame structure pivotally mounted for attaching shovels behind the rear wheels of the tractor, and a single means, capable of being operated by said hydraulic power mechanism, for controlling the positions of both of the aforesaid frame structures on their respective pivots for causing engagement with the ground of the shovels carried thereby and for raising said shovels into supported elevated positions.

ROGER R. COOK.